United States Patent Office 2,950,477
Patented Aug. 23, 1960

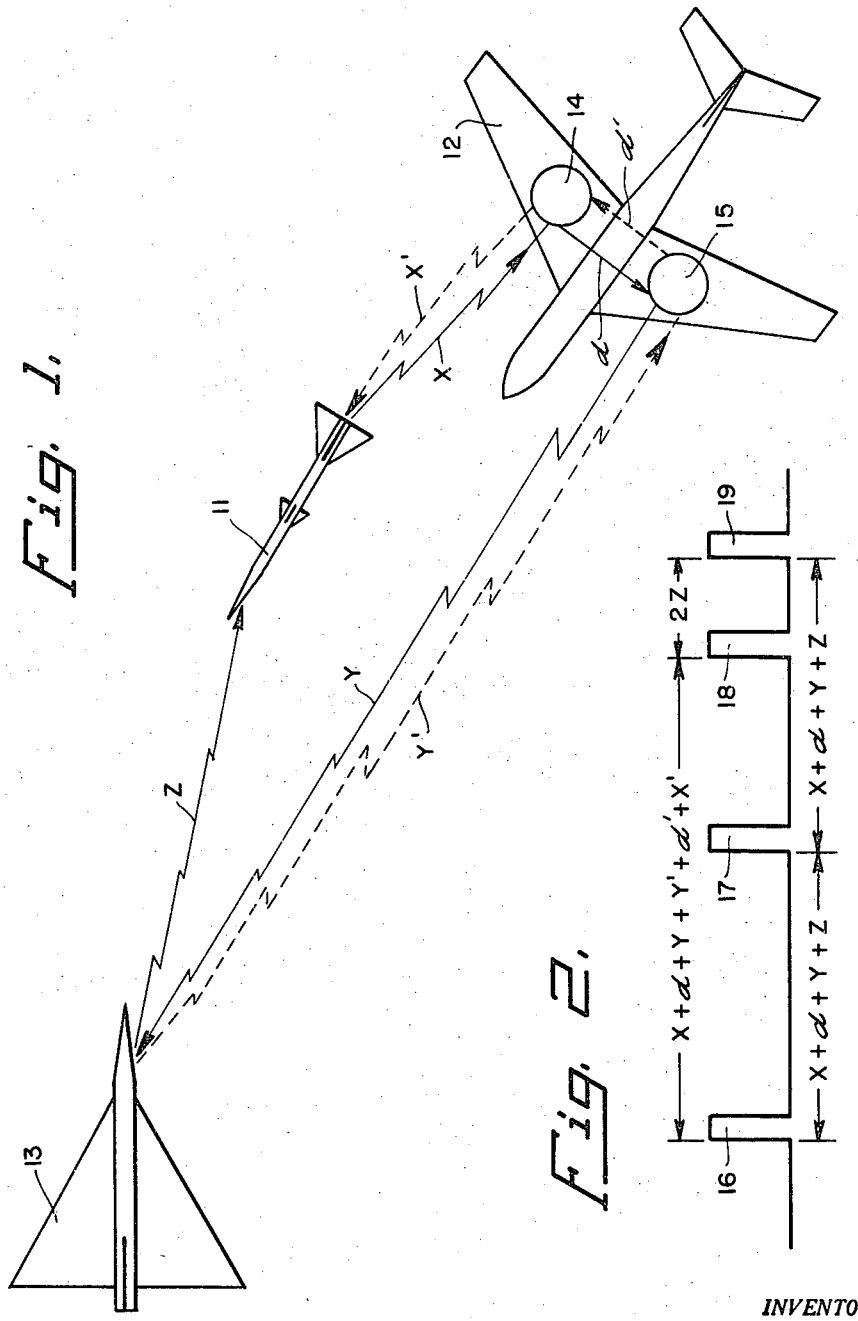

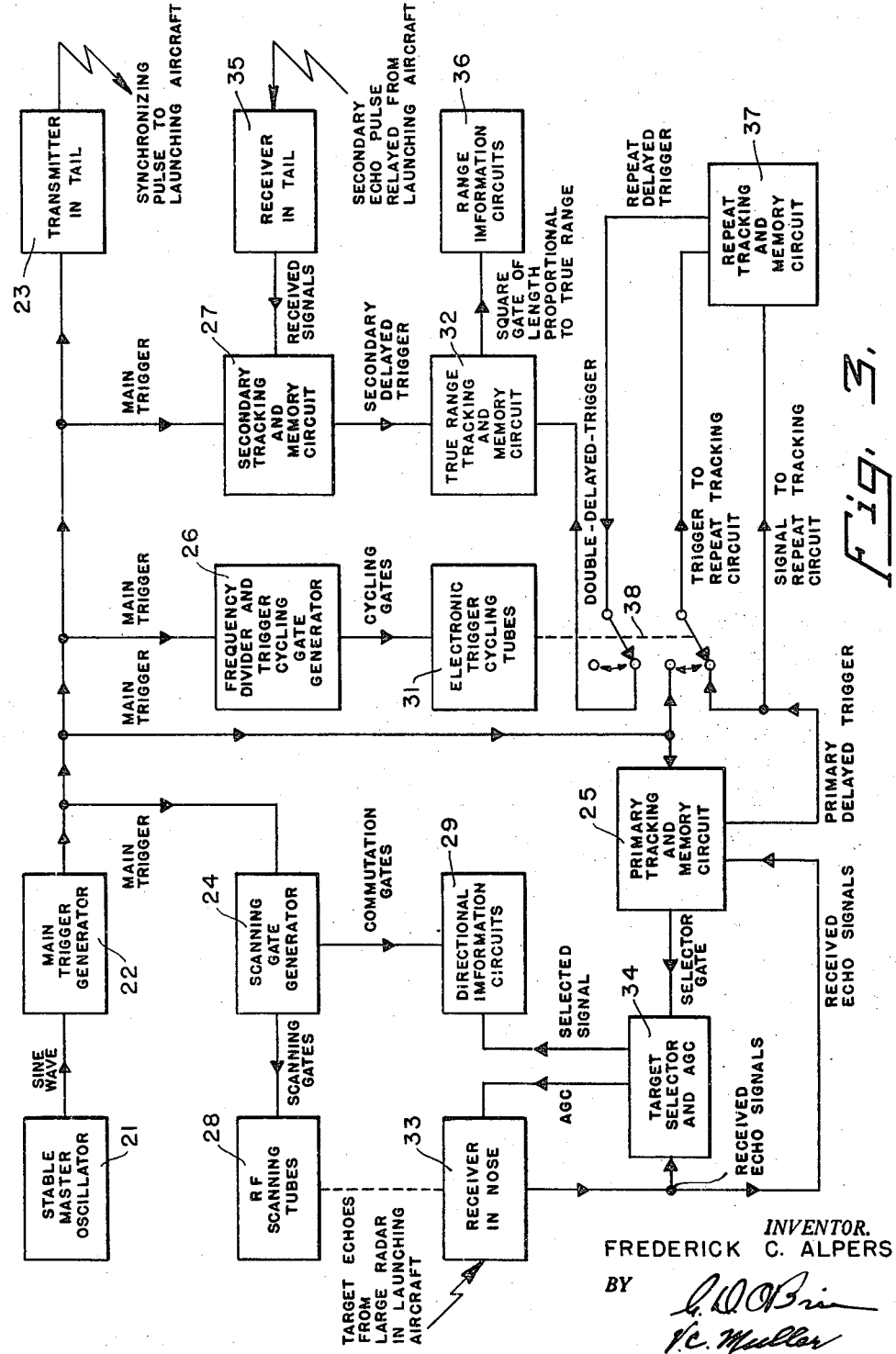

2,950,477

SYSTEM FOR SYNCHRONIZATION AND RANGE MEASUREMENT WITH A SEMIACTIVE RADAR GUIDED MISSILE

Frederick C. Alpers, Riverside, Calif., assignor to the United States of America as represented by the Secretary of the Navy Filed Aug. 12, 1955, Ser. No. 528,141

3 Claims. (Cl. 343—13)

(Granted under Title 35, U.S. Code (1952), sec. 266)

The invention described herein may be manufactured and used by or for the Government of the United States of America for governmental purposes without the payment of any royalties thereon or therefor.

This invention relates to a system for synchronization and range measurement with a semiactive radar guided missile and more particularly to a system and means for synchronization of pulse radars between a launching aircraft and a radar homing missile in such a way that the homing missile's radar may be semiactive in character and yet capable of accurate range measurement.

Previous radar homing missiles which were active in character were limited in range by the size of the radar which could be carried. Previous semiactive missiles utilized the measurement of three sides to solve a triangle by the addition and substraction of signals representing the lengths of the triangle sides involved. However, this system required the extremely accurate transmission of part of the triangle range data from the launching aircraft to the missile.

The system of the present invention consists essentially of a semidirective synchronizing radar transmitter and two radar receivers in the missile, a complementary semidirective radar transmitter and receiver in the launching aircraft, and a second highly directive and powerful radar transmitter and receiver in the launching aircraft. The cycle begins with a pulse being sent out from the tail of the missile to the launching aircraft where it is received by a small radar receiver and after a slight delay the pulse is relayed toward the targets by the main radar of the launching aircraft. This pulse then strikes the target and part of the signal is reflected toward the missile to complete the primary path. The other part of the signal is reflected toward the aircraft, where it is received by the main radar, is slightly delayed and then relayed to the missile by the transmitter of the small radar completing the secondary path. It will be apparent on analysis that the secondary path differs from twice the primary path by an amount equal to twice the distance from the missile to the target. The electronic system disclosed herein actually measures on a pulse timing basis the difference between time intervals for the radar pulse to travel the secondary and twice the primary paths to provide a true radar range measurement which is substantially as accurate as a direct active radar operating between the missile and the target.

The time interval for the radar pulse to travel twice the distance between the radar and the target or the radar transit time between transmission and reception of the radio wave reflected from the target is proportional to actual range or distance from the target and is commonly known in the art as radar range.

An analogous system which initially operates as a semi-active system similar to the system disclosed in the present application but which switches over to an active system during the latter part of the flight and is self-sustaining without loss of the originally selected target or change in range measurement, is disclosed in the copending application of F. C. Alpers for A System for Synchronization and Accurate Range Measurement With Semi-Active to Active Radar Guided Missiles, Serial No. 528,143 filed August 12, 1955.

Another system of synchronization and range measurement with a plurality of radar guided missiles is disclosed in the copending application of F. C. Alpers, Serial No. 528,142 filed August 12, 1955, wherein a system is disclosed for firing a group of missiles simultaneously with one illumination radar for the entire group on the launching aircraft and wherein each of the missiles operates on a different frequency and all are synchronized by a pulse from the lunching aircraft.

One object of the present invention is to provide a means for synchronization of pulse radars between a launching device and a radar homing missile in such a way that the homing missile's radar may be semiactive in character and yet capable of accurate range measurement.

Another object of the present invention is to provide a system for synchronization and accurate range measurement which is operative for greater ranges than an active missile system of comparable size and yet retains the accuracy of an active system.

A further object of the present invention is to provide a system of range measurement utilizing the measurement of three sides to solve a triangle wherein the third side is found by measuring the time between two impulses at the missile rather than by the addition and subtraction of signals representing the lengths of triangle sides involved to provide the optimum accuracy in range measurement.

Other objects and many of the attendant advantages of this invention will be readily appreciated as the same becomes better understood by reference to the following detailed description when considered in connection with the accompanying drawings wherein:

Figure 1 is a schematic diagram illustrating the operation of the system of the present invention;

Figure 2 is a pulse timing diagram;

Figure 3 is a block diagram for the missile portion of the present system; and

Figure 4:
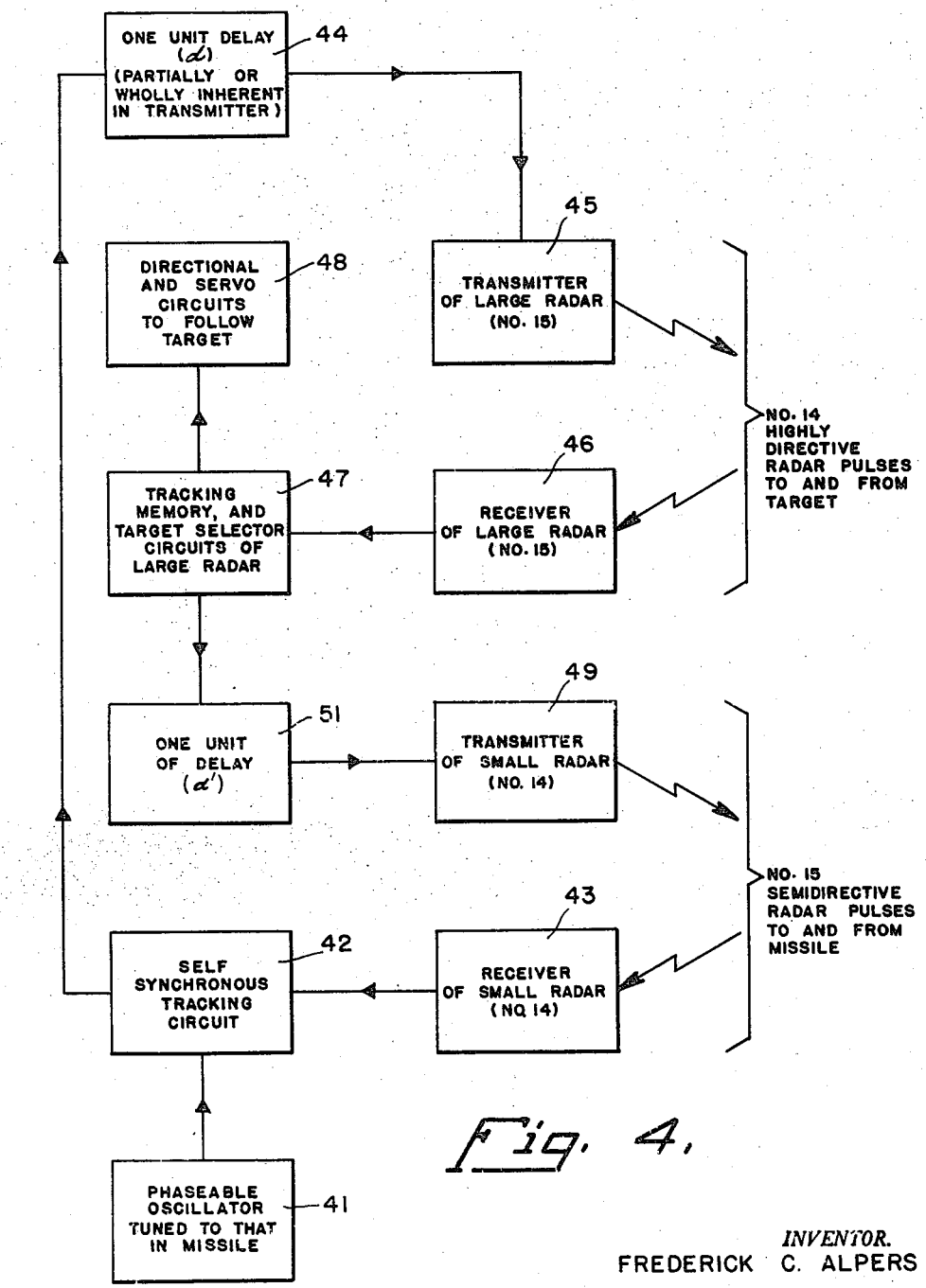
Figure 4 is a block diagram for the launching aircraft portion of the present system.

Referring now to the drawings in detail, one preferred embodiment of the present invention is illustrated in Figure 1 wherein the missile 11 has been launched from the aircraft 12 toward the target aircraft 13. The function of establishing the pulse repetition frequency and initiating the radar cycle is carried out by the missile 11.

The cycle begins with a pulse being sent out from the tail of the missile 11 to the launching aircraft 12 along the path X where it is received by a small semidirective radar 14. After a slight delay, $d$, the pulse is relayed toward the target aircraft 13 by the main highly directive large radar 15 on the launching aircraft. This directive pulse travels over the path Y and strikes the target aircraft 13 with a part of the signal being reflected along the path Z to the receiver in the nose of the missile 11 and another part being reflected along the path Y' and being received by the radar 15 in the launching aircraft 12. Upon reaching the aircraft 12 the pulse is then delayed by the same amount $d'$ as before and is then relayed on to the missile by the transmitter of the small radar 14 along the path X'.

From analysis of the pulse timing diagram of Figure 2 it will be apparent that the time between the pulse 16 which is an initiating pulse in the missile and the echo pulse 17 which is the echo pulse received by the missile along the primary path will be the time to travel the distance $X+d+Y+Z$ along the primary path. The time interval between the pulse 16 and the pulse 18 which is received by the missile via the secondary path from the launching aircraft is the time required to travel the distance $X+d+Y+Y'+d'+X'$. Using the signal from the primary path as a trigger, a circuit capable of accurately reproducing delay of the primary path gives an output trigger 19 timed at twice the time interval for the primary path. It will be apparent that the interval between the pulse 18 and the pulse 19 is equal to $2Z$ which is the actual radar range between the missile 11 and the target aircraft 13. By using the signal from the secondary path as a trigger another circuit then tracks the double delayed signal and measures the time interval between these two signals, thereby measuring the true radar range from the missile to target which is equal to $2Z$.

One preferred circuit arrangement for implementing the system illustrated in Figure 1 and described supra is shown in block diagram form in Figures 3 and 4. In Figure 3, the missile portion of the system is illustrated and consists of a master oscillator 21 of good stability which synchronizes trigger generator 22. The output from the trigger generator 22 triggers a number of other circuits one of which is the transmitter 23 mounted in the tail of the missile which sends out a synchronizing pulse to the launching aircraft along the path of X of Figure 1.

The main trigger is also applied to the scanning gate generator 24, the primary tracking and memory circuit 25, the frequency divider and trigger cycling generator 26 and the secondary tracking and memory circuit 27 as illustrated in Figure 2.

The scanning gate generator 24 applies the scanning gates to the RF scanning tubes 28 and commutation gates to the directional information circuits 29. The cycling gates from the frequency divider and trigger cycling gate generator 26 are applied to electronic trigger cycling tube 31. A secondary delayed trigger from the secondary tracking and memory circuit 27 is applied to the true range tracking and memory circuit 32.

The receiver 33 located in the nose of the missile is operatively associated with the RF scanning tube 28 and the target selector and AGC circuits 34 which in turn are connected to the primary tracking and memory circuit 25.

The receiver in the tail of the missile 35 transmits the secondary echo pulse signals received from the small radar 14 on the launching aircraft 12 to the secondary tracking and memory circuit 27. The range information circuits 36 receive a square gate of length proportional to true range from the true range tracking and memory circuit, 32. The repeat tracking and memory circuit 37 receives a primary delayed trigger from the primary tracking and memory circuit 25, then through the switch 38 sends a double delayed trigger to the true range tracking and memory circuit 32.

The block diagram of Figure 4 illustrates one preferred form of the launching aircraft portion of the semi-active system of the present invention and consists of a phaseable oscillator 41 tuned to that in the missile and connected to the self synchronous tracking circuit 42, which receives a signal from the missile through the receiver 43 of the small radar 14 and transmits the signal pulse through a single unit of delay designated by the numeral 44 to the transmitter 45 of the large radar which sends out highly directive radar pulses toward the target. The delay ($d$) may be partially or wholly inherent in the transmitter 45. The echo pulses from the target are received by the receiver 46 and transmitted to the tracking, memory, and target selector circuits 47 of the large radar. The signals from the tracking, memory, and target selector 47 go to both the directional and servo circuits 48 which are adapted to follow the target and through one unit of delay ($d$) to the transmitter of the small radar 49.

*Operation*

In the operation of the system the master oscillator which should have a good inherent stability synchronizes the main trigger generator circuit 22 and the output from the latter then triggers the transmitter 23 in the tail of the missile 11 along with other circuits. A synchronizing pulse is sent out from the missile to the launching aircraft along the path X indicated in Figure 1 where it is received by the receiver 43 of the small radar 14. This is a semidirective radar pulse which is transmitted through the self synchronizing tracking circuit 42 and the single unit of delay 44 to the transmitter of the large radar wherein highly directive radar pulses are sent out to the target aircraft 13 along the path Y. The primary echo of the target goes back to the missile along the primary path Z and is received by the receiver 33 in the nose of the missile.

At the same time a target echo returns to the launching aircraft along the secondary path Y' and is received by the receiver 46 of the large radar 15 and after passing through the tracking, memory, and target selector circuits 47 of the large radar and the single unit of delay, the signal is transmitted by the small radar 14 along the secondary path X' and is received by the receiver 35 in the tail of the missile 11.

The signal from the receiver 33 in the nose of the missile 11 is tracked by the primary tracking and memory circuit 25, is gated by the target selector circuit 34, and is fed into the directional information circuits 29 which keep the antenna system in the nose of the missile following the target. This portion of the system in the missile 11 would probably be somewhat similar to the analogous portion of an active system with scanning, AGC, and other functions accomplished in a similar manner. However, the primary tracking and memory circuit 25 is triggered by the main trigger from generator 22 and tracks the signal received around the primary path. Hence, it follows and remembers the distance $X+d+Y+Z$.

The secondary tracking and memory circuit 27 receives the signal from the receiver 35 in the tail of the missile which has been relayed from the launching aircraft after following the secondary path. Since there is no need for information as to the direction of the launching aircraft and the antenna pattern involved is broad, no scanning, AGC, or directional circuits are needed in connection with the secondary tracking circuit. The latter is triggered from the main trigger and tracks the signal received around the secondary path. Hence, it follows and remembers the distance 2 times $(X+d+Y)$. To derive a pulse having a delay twice that equivalent to the distance $X+d+Y+Z$, another circuit which is called the repeat tracking and memory circuit 37 is switched from a parallel to a series connection with the primary tracking circuit 25 by means of the switch 38. While in parallel with the primary circuit 25 the repeat circuit 37 is triggered by the main trigger and receives tracking corrections causing it to follow and remember the distance $X+d+Y+Z$. While in series, the repeat circuit is triggered by the signal from the primary circuit 25 or by a gate coincident with that signal and then repeats by memory the primary delay, giving a doubly delayed output pulse timed at $2(X+d+Y+Z)$ from the main trigger. Presumably the repeat circuit could spend half of its period in each position although either the parallel or series connection might be favored over the other if so desired.

Switching the repeat circuit from its parallel to its series connection in this repetitive manner would be accomplished by gating control tubes from one position to another, and in Figure 3 these tubes are called electronic trigger cycling tubes 31. Gating the tubes would either be synchronized with a submultiple of the master oscillator frequency or, if the cycling frequency were sufficiently lower than the master oscillating frequency, the gating would be unsynchronized with the rest of the system. If synchronized, the gating would be originated by a frequency divider and trigger cycling gate generator 26 as shown in Figure 3. If unsynchronized, the cycling gate might run in the region between 10 and 50 cycles per second, assuming the master oscillator frequency of about 800 cycles per second. To allow the aircraft to target range Y to reach 75 miles and the other ranges X and Z to reach corresponding distances while the system is in operation, a master oscillating frequency near the above value would be desirable.

Still a fourth tracking circuit, called the true range tracking and memory circuit 32, follows and remembers the timing between two pulses representing the actual radar range from missile to target, 2Z. The first pulse or trigger to the true range circuit 32, is either the secondary echo signal or a gate held in exact coincidence with that echo signal. The other pulse which is tracked by the true range circuit is a double delayed trigger from the repeat tracking circuit 37. Since the double delayed trigger is interrupted periodically by the trigger cycling action, it is necessary that the true range circuit 32 have a memory ability similar to that of the other three tracking circuits. The true range tracking circuit 32 is then able to supply continuously an output square gate equal in duration to the time between the two pulses and hence, is directly proportional to the true range. The square gate is then used by various range information circuits 36 to derive the range voltage and the switching actions desired. It will be apparent that the small radar 14 on the launching missile need only be of moderate power and can have a fairly broad antenna pattern which can be trained in the general direction of the missile, but the large radar 15 must be a highly directive powerful radar which can illuminate and detect targets from long ranges. The small radar can probably be trained on the missile to a sufficient approximation by slaving it in direction to the radar following the target. The receiver of the small radar must be tuned to the transmitter in the tail of the missile and the receiver in the tail of the missile must be tuned to the transmitter of small radar 14. The receiver 46 of the large radar 15 and the receiver 33 in the nose of the missile must both be tuned to the large transmitter 45. If desired all the pulses involved may be transmitted at the same frequency, since the timing of the pulses provides a means of distinguishing them.

Referring now to the block diagram of Figure 4, the initial pulse from the missile is received by the receiver 43 for the small radar and is tracked by the self synchronous tracking circuit 42 which acts to hold the phaseable oscillator 41 for this circuit in synchronism with the master oscillator 21 of the missile 11. This excludes any effect of other pulse signals on this part of the system. Either the pulse which is tracked or the gate coincident with it is in use in triggering the transmitter 45 of the large radar. This triggering action takes place after a known delay which must accurately equal a later delay in the secondary path, thus the unit of delay 44 and the unit of delay 51 must be exactly equal. Part of the delay 44 is inherent in the modulator of the large radar and the remainder may be made up by a short delay line, if the delay in the secondary path is inherently longer. The firing of the large radar completes the launching aircraft's function in regard to the primary path. In traveling the secondary path the echo signal from the target enters the airplane system via the receiver 46 of the large radar 15. There it is tracked and utilized in gaining directional information regarding the tracked target in the circuit 47. After a delay 51 equal to that of the primary path, the echo signal or a gate coincident with it is used to trigger the small transmitter 49 and the secondary signal pulse is thus relayed on to the missile.

In the explanation above it was assumed that the effects of the velocities of the aircraft, missile, and target were negligible, but actually, a slight error in range measurement is introduced by motion of the missile and aircraft with respect to the target during the time the radar pulses are traversing the primary and secondary paths. With both missile and aircraft approaching the target at maximum velocities presently attainable and with the aircraft still at maximum range, a range error of about 5 feet would be introduced. However, such an error is only in the order of 1/50 of the errors possible elsewhere in the system assuming optimum performance of present equipment. These large errors are principally due to (1) variations in individual modulator tubes and delay lines from set to set, (2) jitter in the firing of various modulator tubes involved, and (3) correcting motions of the synchronizer gates in their tracking processes. The aggregate of these errors would amount to ½ microsecond or 250 feet with equipment currently in use.

Conventional techniques could be utilized in initiating the action of the four tracking circuits to track their assigned signals.

Since the system of the present invention and also of the copending inventions does not require motion of the launching aircraft, the system will function with equal effectiveness with ground or ship based radars in place of the radars in the launching aircraft. Also, since the system is not necessarily contingent upon use of a pilotless missile, a piloted aircraft may be substituted for the missile and range information could be obtained in the same manner.

Obviously many modifications and variations of the present invention are possible in the light of the above teachings. It is therefore to be understood that within the scope of the appended claims the invention may be practiced otherwise than as specifically described.

What is claimed is:

1. A system for synchronization and range measurement with radar guided missiles comprising a launching aircraft having a highly directive radar transmitter and receiver and a semi-directive radar transmitter and receiver, a guided missile having a semi-directive radar transmitter and receiver mounted in the tail thereof and a directive receiver mounted in the nose thereof, delay means between the semi-directive receiver and the large directive radar in the launching aircraft and equal delay means between the receiver of the directive radar and the transmitter of the semi-directive radar on said launching aircraft, the pulse from the transmitter in the tail of said missile being received by the semi-directive radar on the launching aircraft and after one unit of delay being transmitted as a highly directive pulse from the directive transmitter on the launching aircraft, the echo from said directive pulse being received by the receiver in the nose of said missile to complete the primary path, another echo signal being received by the receiver of the directive radar on the launching aircraft and after one unit delay being transmitted by the semi-directive radar on the launching aircraft to the receiver in the tail of the missile, means in said missile for generating a pulse at an interval equal to twice the time required for the pulse to follow the primary path, and means for generating a square gate signal from the latter pulse and the pulse following the secondary path which has a length proportional to the true radar range between the missile and the target.

2. A system for synchronization and range measurement with radar guided missiles comprising a launching aircraft having a highly directive radar transmitter and receiver and a semi-directive radar transmitter and receiver, a guided missile having a semi-directive radar transmitter and receiver mounted in the tail thereof and a directive receiver mounted in the nose thereof, delay means between the semi-directive receiver and the directive transmitter on said launching aircraft and equal delay means between the directive receiver and the semi-directive transmitter on said launching aircraft, means on said missile for generating a trigger to synchronize the action of said system and actuate the transmitter in the tail thereof, the synchronizing pulse from the transmitter in the tail of said missile being received by the semi-directive radar receiver on the launching aircraft and after one unit of delay being transmitted as a highly directive pulse from the directive transmitter on the launching aircraft, the echo from said directive pulse being received by the receiver in the nose of said missile to complete the primary path, another echo signal being received by the receiver of the directive radar on the launching aircraft and after one unit delay being transmitted by the semi-directive radar on the launching aircraft to the receiver in the tail of the missile, means in said missile for generating a pulse at an interval equal to twice the time required for the pulse to follow the primary path, and means for generating a signal from the latter pulse and the pulse following the secondary path which is equal to the true radar range between the missile and the target.

3. A system for synchronization and range measurement with radar guided missiles comprising a launching aircraft having a highly directive radar transmitter and receiver and a semi-directive radar transmitter and receiver, a guided missile having a semi-directive radar transmitter and receiver mounted in the tail thereof and a directive receiver mounted in the nose thereof, means for operatively connecting and equalizing the delay between the semi-directive receiver and the directive transmitter and the directive receiver of the semi-directive transmitter on said launching aircraft, means on said missile for generating a trigger to synchronize the action of said system and actuate the transmitter in the tail thereof, the synchronizing pulse from the transmitter in the tail of said missile being received by the semi-directive radar from the launching aircraft and after one unit of delay being transmitted as a highly directive pulse from the directive transmitter on the launching aircraft, the echo from said directive pulse being received by the receiver in the nose of said missile to complete the primary path, another echo signal being received by the receiver of the large radar in the launching aircraft and after one unit delay being transmitted by the small radar in the launching aircraft to the receiver in the tail of the missile, means in said missile including primary and repeat tracking and memory circuits for generating a pulse at an interval equal to twice the time required for the pulse to follow the primary path, means including secondary and true range tracking and memory circuits for generating a square gate signal from the latter pulse and the pulse following the secondary path which has a length proportional to the true range between the missile and the target, and means including range information circuits to derive the range voltage.

References Cited in the file of this patent

UNITED STATES PATENTS 2,746,034     Hasbrook _____ May 15, 1956